Figure 1:
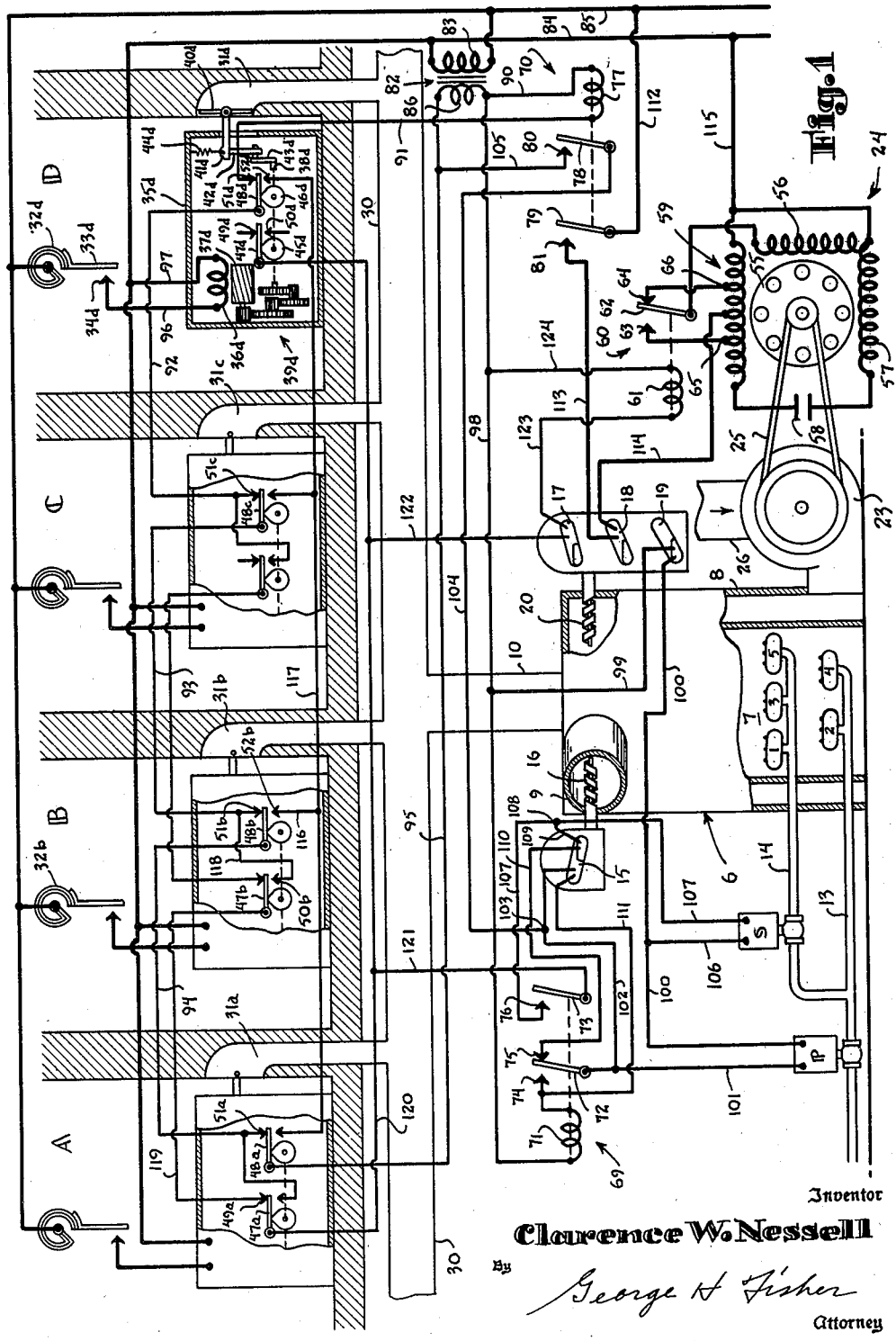

Patented July 14, 1942

2,290,066

UNITED STATES PATENT OFFICE 2,290,066

HEATING AND TEMPERATURE REGULATION

Clarence W. Nessell, Dayton, Ohio, assignor to Minneapolis-Honeywell Regulator Company, Minneapolis, Minn., a corporation of Delaware Application September 30, 1938, Serial No. 232,603

19 Claims. (Cl. 236—9)

My invention embraces improvements in the field of automatic control of heating, ventilating, cooling, and air conditioning installations and has as one of its principal objects to more nearly balance the output of the heating or cooling equipment etc., with the demands upon it. My purpose is to accomplish this object and thereby gain appreciable economies in operation in a more reliable, satisfactory, and inexpensive manner than has heretofore been possible.

The principles of my invention are applicable to both zoned type installations and those not of a zoned type and is broadly adaptable to the control of various types of equipment employed in systems wherein a fluid medium is circulated to spaces wherein a condition of the air is to be modified and regulated.

The following objects will indicate the nature of my invention from the standpoint of what it is intended to accomplish and a more complete understanding of the invention may be gained from the accompanying detailed specification and drawings of certain embodiments thereof.

An object of my invention is to vary the capacity of a fluid medium treating unit serving a zoned installation in accordance with the number of zones requiring fluid medium for modifying the condition of the air therein and similarly varying the rate at which fluid medium is circulated to the zones.

Another object is to operate a fluid medium treating unit in stages in accordance with outdoor temperature while at the same time operating a fluid medium circulating device in stages.

A further object is to provide a system wherein fluid medium is gently supplied at all times in a heating installation when the outdoor temperature is below a predetermined value.

Another object is to provide an arrangement for fluid fuel fired heaters whereby fuel is supplied at increased capacity for starting and as soon as it has been ignited may then be supplied at reduced capacity.

Another object is to balance the capacity of an air treating unit in an air conditioning system and the rate of delivery of air to the conditioned zone or zones in stages in accordance with either the number of zones demanding conditioned air or with outdoor temperatures.

Another object is the provision in an air conditioning system of stage control apparatus for continuously providing a gentle supply of conditioned air to a zone or zones being served when outdoor temperature is below a predetermined value and increasing the supply to a second stage upon a space or zone thermostat calling for heat.

Other objects and numerous advantages of the invention will become apparent from the attached drawings and specification, the invention residing in the improved arrangement and combination of parts and sequence of operation as well as in the specific manner in which my particular sequence is obtained. I have directed the appended claims toward what I consider to be my contribution to the art and upon which I desire protection by Letters Patent of the United States.

Figure 1 of the drawings represents a zoned type warm air heating system embodying my invention therein in one form.

Figure 2:
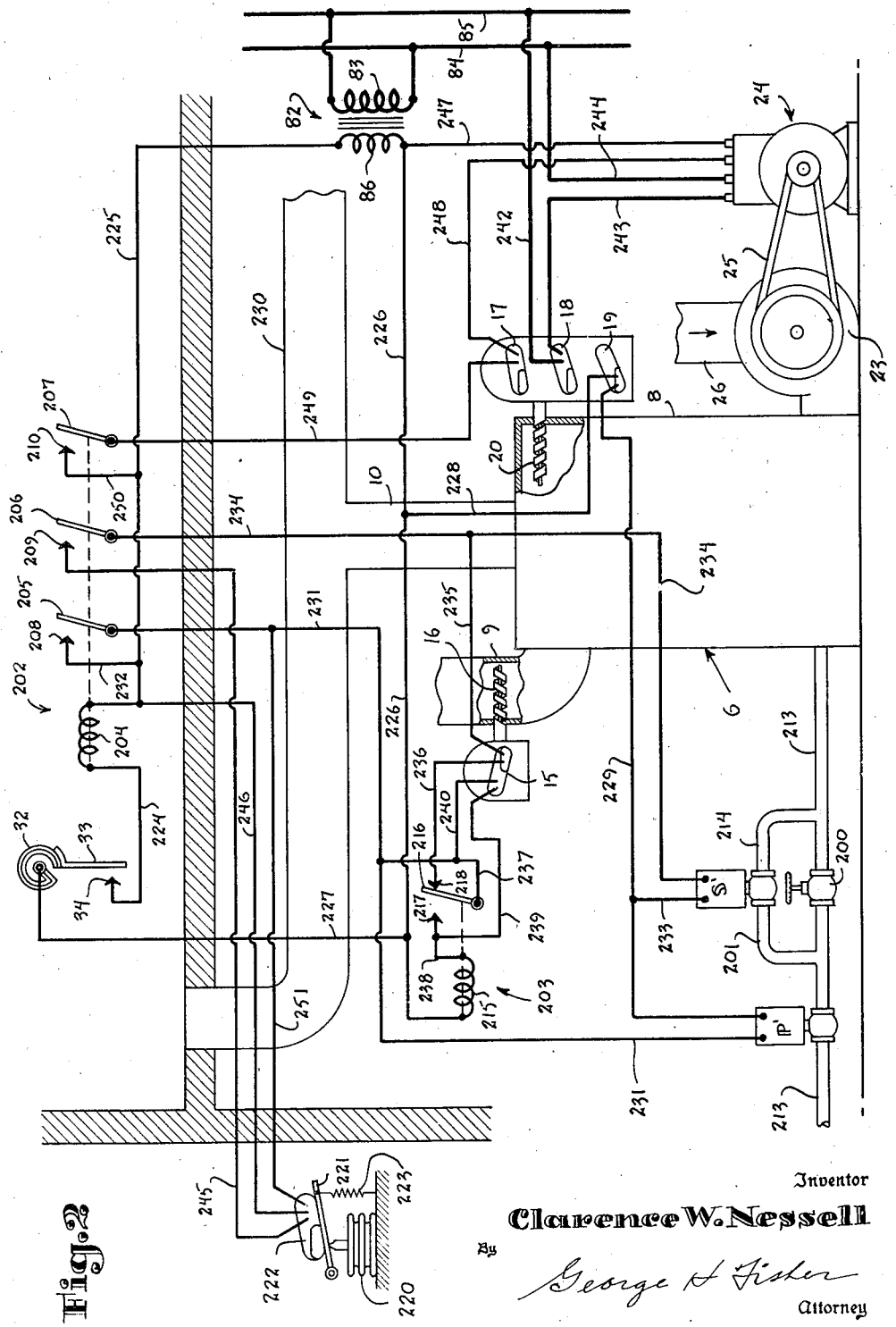

Figure 2 represents a warm air heating system employing an outdoor thermostatic device and embodying another form of my invention.

Referring to Figure 1 of the drawings, I have shown a portion of a building divided into zones and having a warm air type heating system including a furnace generally indicated at 6. The furnace has a combustion chamber 7 and a casing or jacket 8 which forms a bonnet for the furnace and in which the air is heated. A stack 9 communicates with the combustion chamber 7 for carrying away the burnt gases of combustion, and a warm air duct 10 conveys air to the various ducts for distributing it to the spaces being heated. My furnace is of the gas fired type and gaseous fuel is supplied through a main conduit 13 and a branch conduit 14. In this particular embodiment of my invention the branch conduit 14 supplies fuel to a group of burners which I have designated 1, 3 and 5, and the main conduit 13 supplies fuel to a pair of burners which I have designated 2 and 4. Interposed in the conduit 13 is an electric solenoid type control valve which I have designated by the letter P, and interposed in the branch conduit 14 is a similar control valve which I have designated by the letter S, and I will hereafter refer to the valve P as a primary valve and the valve S as a secondary control valve. The customary pilot burner which is employed in systems of this type may be used adjacent one of the main burners, or if desired an individual pilot burner may be used with each main burner. It is to be understood also that the conventional safety pilot which shuts down the system in the event of extinguishment of the pilot flame may be used with the pilot burner.

Numeral 15 indicates a double ended mercury switch which is operated in a conventional manner by a helical thermostatic element 16 responsive to the temperatures in the stack 9. This particular switch is of the slip friction type, that is, there is frictional engagement between the mounting means of the switch itself and the operating shaft which connects to the thermostatic element. The manner of operation of this switch is such that it is tilted to cause the globule of mercury therein to flow to one end of the mercury tube upon a rise in stack temperature and to flow to the opposite end of the tube on a drop in stack temperature, these operations of the mercury switch taking place upon the said changes in stack temperature irrespective of the magnitude of the temperature. For a complete and detailed disclosure of switch 15 reference may be had to the patent to L. A. M. Phelan, No. 1,929,606 of October 10, 1933.

Numerals 17, 18 and 19 indicate mercury switches, all of which are operated by a helical thermostatic element 20 responsive to the temperatures within the bonnet 8. The mercury switch 18 is arranged to be closed at a predetermined bonnet temperature; the switch 17 closes at a relatively higher temperature, and switch 19 is arranged to be opened at a still higher temperature and forms a high limit switch as will become apparent later in the specification.

For forcibly circulating air through my entire system, I provide a circulating fan 23 which may be driven by a variable speed condenser induction type electric motor indicated generally at 24 by means of a belt 25. The fan 23 has a suction conduit 26 which communicates with the return air ducts of the various spaces being heated and the fan discharges into the jacket 8 for forcing air to be heated therethrough. I will describe the motor 24 more in detail later.

The letters A, B, C and D of Figure 1 designate individual zones of the building being heated and may comprise individual rooms or groups of rooms. The air duct 10 communicates with an air distributing conduit 30 which has a plurality of branch conduits 31a, 31b, 31c and 31d which communicate with the zones A, B, C and D, respectively. Inasmuch as the apparatus which I have provided in zones A, B, C and D may preferably be identical, I have shown that in zone D only in detail and I will describe with particularity the structure of that zone. I have designated the various elements of the other zones with corresponding numerals having a distinguishing letter and therefore it will not be necessary to describe in detail the structure of zones A, B and C. Referring now to zone D, I have provided therein a bimetallic thermostat 32d of conventional type having a movable switch arm 33d cooperating with a fixed electrical contact 34d. The thermostat controls an electric damper motor which is disposed within the housing indicated at 35d. The damper motor comprises a winding 36d and an armature 37d, the armature being arranged to drive the shaft 38d through a suitable reducing gear train 39d. Numeral 40d indicates an air damper disposed in the extremity of the branch duct 31d and pivoted so that it may be rotated about its pivot in a manner to either open or close off the extremity of the branch duct. Connected to the damper 40d is an operating lever 41d and suitably connected to this lever is a connecting link 42d which engages with a crank 43d at the end of the shaft 38d. The lever 41d is biased towards closed position of the damper by means of a coil spring 44d connected thereto. The damper motor is of a type such that when it is energized the crank 43d is rotated in a direction to fully open the damper 40d. It will be seen that the lever 41d operates in a slot in a side wall of the housing 35d and when the damper has been moved to fully open position the lever 41d engages the bottom of the slot, which acts as a stop and stalls the motor. The damper then remains in open position until the driving motor has been deenergized, at which time the spring 44d then returns the damper to its closed position as shown in the drawing. Mounted on the shaft 38d as I have indicated in Figure 1, are two cams 45d and 46d and these cams are arranged to operate a pair of electric switch arms 47d and 48d, respectively, the arms being in the position shown when the damper is closed. The switch arm 47d cooperates with upper and lower fixed electrical contacts 49d and 50d and the switch arm 48d cooperates with upper and lower fixed electrical contacts 51d and 52d, respectively. While no electrical connections are made to the fixed contacts 49d and 50d of zone D, these contacts are identical with similar contacts of the other zones to which electrical connections are made and to which I will refer more particularly in the description of operation.

Referring now to the variable speed condenser induction type motor 24, this motor comprises an armature 55, field windings 56 and 57 and condenser 58. Numeral 59 indicates generally an autotransformer and as may be seen from the drawings, the winding 57 is connected across the terminals of the autotransformer with the condenser 58 in series with this winding so that the full voltage of the autotransformer is impressed across the winding 57 and condenser 58. The motor is of the split phase type, the windings 56 and 57 being connected at one end, and the speed of the motor may be varied by varying the voltage impressed upon the winding 56. For doing so I have provided an electrical relay indicated generally at 60 comprising a coil 61 arranged to operate a switch arm 62 cooperating with fixed electrical contacts 63 and 64. Switch arm 62 as shown is connected to one end of the field winding 56 and fixed contacts 63 and 64 are connected to taps 65 and 66 disposed on opposite sides of the mid point of the autotransformer 59. The mid point and the right end terminal of the autotransformer may be connected to a source of current supply as I will presently point out, and it will therefore be obvious that line voltage exists between the mid point and the right end of the autotransformer. Points other than the mid point of the autotransformer might be connected to the line. It will therefore be obvious that when switch 62 is in the position shown the field winding 56 will be connected between tap 66 and the right end of the autotransformer and hence the voltage impressed thereacross will be less than line voltage. When switch arm 62 engages fixed contact 63, field winding 56 will be connected between tap 65 and the right end of autotransformer 59 and therefore a voltage greater than line voltage will be impressed upon the field winding 56. It follows therefore that when the relay 60 is energized, switch arm 62 will be moved to the left thereby increasing the voltage across field winding 56 and increasing the speed of the fan motor 24 to its higher or second speed. Inasmuch as condenser induction type electric motors are old in the art, the specific details of its construction need not be described.

For cooperating in the control of my entire system, I provide an electrical relay generally indicated at 69 and a second electrical relay generally indicated at 70. Relay 69 comprises a coil 71 arranged to operate a pair of switch arms 72 and 73 in a conventional manner. Switch arm 72 cooperates with fixed electrical contacts 74 and 75 and the switch arm 73 cooperates with fixed electric contact 76. The relay 70 comprises a coil 77 arranged to operate switch arms 78 and 79 cooperating with fixed electrical contacts 80 and 81, respectively.

For supplying power at suitable voltage for the various instruments and control devices of my system, I provide a voltage step-down transformer generally indicated at 82. The transformer 82 comprises a primary winding 83 connected to a pair of line conductors 84 and 85 which may lead to an external source of power, not shown. Numeral 86 indicates the secondary or low voltage winding of the transformer which as usual has a fewer number of turns than the primary winding.

I will now describe the complete operation of the embodiment of my invention disclosed in Figure 1. With the parts in the position shown, all the zone thermostats are satisfied and therefore their respective dampers are in the closed position as may be seen in zone D. At this time the relay coil 77 of relay 70 is energized thereby maintaining its associated switches in the open position. The electrical circuit for the coil 77 may be traced as follows: from one side of the secondary winding 86 through a wire 90, coil 77, wire 91, fixed contact 51d, switch blade 48d, a wire 92, fixed contact 51c, switch blade 48c, wire 93, fixed contact 51b, switch blade 48b, wire 94, fixed contact 51a, switch blade 48a and wire 95 back to the other terminal of secondary winding 86. Now let us assume that the thermostat of zone D closes its contacts indicating a need for heat at that particular zone. Upon closure of thermostat 32d, winding 36d of the damper motor will be energized through a circuit from line conductor 85 through thermostat 32d, fixed contact 34d, wire 96, winding 36d, and wire 97 back to line conductor 84. The damper motor now operates in the manner above described to fully open the damper 40d. At the same time the cams 45d and 46d will be operated through substantially 180° whereby the switch arms 47d and 48d will be brought into engagement with their lower associated fixed contacts rather than their upper contacts with which they were previously in engagement. Obviously, separation of blade 48d from fixed contact 51d will interrupt the above described electrical circuit and coil 77 now becomes deenergized permitting closure of switches 78 and 79. It will be obvious that the operations so far described would be brought about by closure of any one of the zone thermostats in a similar manner.

Immediately upon closure of switch 78 both the primary and secondary control valves open, the primary valve being opened by the following energizing circuit: from secondary 86 through wire 98, wire 99, mercury switch 19, wire 100, the primary valve, wire 101, wire 102, junction 103, wire 104, switch blade 78, fixed contact 80, wire 105, and a portion of wire 95 back to the secondary winding 86. Simultaneously the secondary valve is also opened through an energizing circuit which is as follows: from secondary winding 86 through wire 98, wire 99, switch 19, wire 100, wire 106, the secondary valve, wire 107 to junction 108, wire 109, the right end of mercury switch 15 (the contacts of which are made at this time), wire 110, fixed contact 75, switch blade 72, a portion of wire 101, wire 102 to juncture 103, wire 104 through switch 78, wire 105 and a portion of wire 95 back to secondary winding 86. Fuel will now be supplied through both the primary and secondary valves to all the burners and heating will begin in the combustion chamber 7 for supplying heated air to zone D through its open damper. It is important in my invention that both primary and secondary valves open upon an initial demand for heat and the importance of this feature will become more apparent later in the specification when I describe other forms of my invention.

Now as soon as there has been a rise in stack temperature, mercury switch 15 will be tilted to the left by element 16 thereby interrupting the above described circuit for valve S, causing that valve to close combustion having been properly established and making the contacts at the left end of the mercury tube. Upon these contacts becoming made, an energizing circuit for relay 69 is completed and is as follows: from secondary winding 86 through wire 98, coil 71, wire 111, left end of mercury switch 15, a portion of wire 102, junction 103, wire 104, switch 78, and wire 105 back to wire 95 and secondary winding 86. Switch arm 72 will now be operated to the left, disengaging from fixed contact 75, thereby producing a second gap in the above described circuit for secondary valve S and upon engaging fixed contact 74 producing a maintaining circuit for coil 71 as follows: from secondary 86 through wire 98, coil 71, fixed contact 74, blade 72, a portion of wire 101, wire 102 to junction 103 and wire 104, blade 78, contact 80, wire 105, wire 95, back to the other terminal of secondary winding 86. The necessity of producing the second gap in the circuit for secondary valve S will become more clear later. Upon energization of relay coil 71, switch blade 73 is also moved to the left so as to engage with fixed contact 76.

As soon as the temperature within the bonnet 8 has risen to a suitably high value for heating purposes mercury switch 18 will be tilted to the right completing an energizing circuit for the autotransformer 59 as follows: from line conductor 85, wire 112, switch blade 79, fixed contact 81, wire 113, mercury switch 18, wire 114 to the mid point of the autotransformer winding through the right half of the said winding and a wire 115 back to line conductor 84. Immediately upon energization of the autotransformer the field winding 57 will be energized and the field winding 56 will also be energized at a voltage less than line voltage (the switch blade 62 being in the position shown at this time) in a manner which has already been described. The fan 23 will now be operated at a relatively low speed for forcibly circulating warm air through the various ducts and zone damper 40d to the zone D.

My control system arrangement is of a two-stage type and is of such a nature that upon more than one zone damper demanding heat I increase the heating capacity of the furnace to a maximum by reopening the secondary valve S and also providing for increase in the fan speed to its second stage or maximum speed.

As has been assumed, the thermostat of zone D is calling for heat and now let us assume that any one other zone thermostat, for example for purposes of illustration, thermostat 32b also closes, indicating a need for heat. It will be understood that the functions mentioned in the preceding paragraph may be brought about by closure of any two or more of the zone thermostats and these functions come about in the following manner: secondary valve S will now be energized through the following circuit: from secondary 86 through wire 95, switch blade 48a, switch contact 51a, wire 94, switch blade 48b, fixed contact 52b, wire 116, wire 117, fixed contact 52d, switch blade 48d, wire 92, fixed contact 51c, switch blade 48c, wire 93, wire 118, fixed contact 50b, switch blade 47b, wire 119, fixed contact 49a, switch blade 47a, wire 120, wire 121, switch blade 73, fixed contact 76, wire 107, secondary valve S, wire 106, wire 100, mercury switch 19, wire 99, and wire 98 back to secondary winding 86. Secondary valve S now opens, supplying fuel to burners 1, 3, and 5 so that the furnace now operates at maximum capacity whereby additional heat may be supplied for the needs of zone B and and further zones which may demand heat before zones B and D become satisfied. The bonnet temperature will now rise by reason of the additional burners having been cut in and at a predetermined temperature mercury switch 17 will be tilted to the right to close a circuit for energizing the relay coil 61. This circuit may be traced exactly the same as the last described circuit above as far as wire 120. The circuit now being described continues from wire 120 through wire 122, mercury switch 17, wire 123, coil 61, wire 124 back to wire 98 and secondary winding 86. Immediately upon energization of coil winding 61, switch blade 62 is moved into engagement with fixed contact 63 and a voltage greater than line voltage is now impressed upon the field winding 56 in a manner which I have already described. The speed of the fan motor is now increased to maximum and the entire system is operating at its second stage capacity with fuel being supplied to all burners and the fan operating at relatively higher speed.

Let us assume now that zone B becomes satisfied and only zone D remains calling for heat according to the original assumption; the system will now automatically operate so as to drop back to its first stage or reduced capacity operation. Upon thermostat 32b opening the above described circuits which were brought about by reason of its closure for opening valve S and energizing coil 61, are now interrupted. Valve S will immediately close, cutting off the supply of fuel to burners 1, 3 and 5 and the fan speed will immediately drop back to its relatively low value. Accordingly, the stack temperature will drop relatively quickly and the slip friction switch 15 will return to its position as shown in the drawings. However, switch blades 72 and 73 will remain in their leftward position by reason of the maintaining circuit which I described above through the coil 71. Now even though the contacts at the right end of mercury switch 15 are made, secondary valve S will not be opened in the manner in which its was opened upon the initial demand for heat simultaneously with valve P by reason of the switch blade 72 not being in contact with fixed contact 75 and thereby producing the second gap to which I have previously referred in the original energizing circuit for valve S.

From the foregoing it is apparent that I have provided a novel system for more nearly balancing the output capacity of the heating system against the needs for heat as determined by the number of zones in which the temperature is below the required value. Additionally, by reason of my provision of primary and secondary control valves which both open upon an initial demand for heat, a sufficient volume of gas is supplied to insure positive ignition at the burners. My control arrangement as I have pointed out is such that the secondary valve will open whenever more than one thermostat is calling for heat but when all of the thermostats except one have become satisfied, the secondary valve will again close.

Referring now to Figure 2 of the drawings wherein I have disclosed a second embodiment of my invention employing an outdoor temperature responsive controller, I have numbered all those parts which correspond to and are identical with similar elements of Figure 1 with the same numbers. Those parts of Figure 2 which are not the same as what has already been disclosed in Figure 1, I have numbered using numbers of over 200 and I will now describe these differing features in detail.

It will be seen that in Figure 2, I use the same type of warm air furnace which may be identical in construction and the same stack and bonnet temperature switches. However, in this embodiment I utilize only a single burner which is supplied with fuel through a conduit 213. Interposed in the conduit 213 is a primary control valve which I have designated as P' in this modification. The conduit 213 has a hand valve 200 interposed therein beyond valve P' and interposed in a conduit 201 by-passing the valve 200 is the secondary control valve which I have designated S' in this modification. It will be understood that whether a single main burner is used as in this embodiment or a plurality of burners as in the previous embodiment is a matter of choice. In this species, however, the advantages of opening both the primary and secondary valves upon an initial demand for heat now become apparent inasmuch as the larger supply of fuel upon starting burner operation insures that flame will probably appear at the time of ignition. The piping arrangement of Figure 2 may of course be used in the embodiment of Figure 1. By means of the hand valve 200 a certain amount of restriction is placed in the conduit 213 and this restriction limits the amount of fuel which will pass through the conduit when only valve P' is open. Therefore, when valve S' is open, by-passing the hand valve 200, an additional volume of fuel is allowed to pass through the conduit 213 and to the burner.

The fan 23 which I employ for forcibly circulating air through the system is identical with that of the previous embodiment and the two-speed motor 24 including the means for changing the speed, may be the same as that of the previous modification, and therefore I have not repeated the details of its construction in Figure 2.

In Figure 2 I employ electrical relays generally designated at 202 and 203. Relay 202 comprises a conventional coil 204 arranged to operat three switch arms 205, 206 and 207, the switch arms cooperating with fixed electrical contacts 208, 209 and 210, respectively. The relay 203 comprises coil 215 arranged to operate the switch arm 216 cooperating with fixed electrical contacts 217 and 218. The outdoor temperature controller of Figure 2 may be of the type comprising an expansible bellows member 220 filled with a temperature responsive medium and arranged to actuate a lever 221 upon expansion and contraction of the medium within the bellows. The lever 221 carries a mercury switch 222 having three electrodes at one end, the lever being biased toward the operating end of the bellows by coil spring 223. The outdoor temperature responsive controller is arranged to cause the electrodes at the right end of the mercury tube to be engaged by the globule of mercury therein when the outdoor temperature has fallen to a predetermined value.

The form of my invention disclosed in Figure 2 operates similarly to that of Figure 1 in that both the primary and secondary valves open upon an initial demand for heat and the secondary valve is then closed upon a rise in stack temperature. However, in this second form of the invention the second stage operation of the system is brought about in response to the outdoor temperature controller. This form of the invention also has the function that the primary and secondary valves may both be opened simultaneously upon the outdoor temperature falling to a predetermined value even though the room thermostat is not calling for heat. Furthermore, in this form of the invention when the outdoor temperature is below a predetermined value, the primary valve is maintained open continuously irrespective of the space thermostat. I will now describe the complete operation of Figure 2 setting forth in detail how the various functions are brought about.

Let us assume first that the outdoor temperature is high enough so that the outdoor temperature controller remains in the position shown in the drawing. Now upon closure of space thermostat 32 indicating a need for heat, a circuit is completed for energizing relay coil 204 as follows: from fixed contact 34 of the thermostat, through wire 224, coil 204, wire 225, secondary winding 86 of transformer 82, wire 226 and wire 227 back to thermostat 32. Immediately upon energization of coil 204, switch blades 205, 206 and 207 are moved to the left into engagement with their respective fixed contacts. Valve P' is now opened by reason of completion of the following energizing circuit therefor: from secondary winding 86 through wire 226, wire 228, switch 19, wire 229, valve P', wire 231, switch blade 205, fixed contact 208, wire 232 and wire 225 back to secondary winding 86. Simultaneously, an energizing circuit for opening valve S' is completed as follows: from secondary winding 86 through switch 19 to wire 229 in the same manner as the above described circuit, thence through a wire 233, valve S', wire 234, wire 235, the right end of mercury switch 15, wire 236, fixed contact 218, switch blade 216, wire 237, wire 231, switch blade 205, fixed contact 208, wire 232 and wire 225 back to secondary winding 86. Thus upon a demand for heat by the space thermostat both the primary and the secondary valves are immediately opened in the same manner as in the previous modification, and a relatively large amount of fuel is supplied to insure proper ignition at the burner and heating will begin within the furnace. As soon as the stack temperature has risen a predetermined amount as in the previous form of the invention, the stack switch 15 will be tilted to the left interrupting the above described circuit through which valve S' was energized. Valve S' will now close and a circuit for energizing relay 203 will be completed through the left end of mercury switch 15 as follows: from secondary winding 86 through wire 226, coil 215, wire 238, wire 239, the left end of mercury switch 15, wire 240, wire 237, wire 231, switch 205, fixed contact 208, wire 232 and wire 225 back to secondary winding 86. Switch blade 216 will now be moved to the left, producing a second gap in the original energizing circuit for valve S' by disengaging from fixed contact 218 and at the same time establishing a maintaining circuit for relay 203 by engaging with fixed contact 217, the maintaining circuit being as follows: from secondary winding 86 through wire 226, coil 215, wire 238, fixed contact 217, switch blade 216, wire 237, wire 231, switch blade 205, fixed contact 208, wire 232 and wire 225 back to the secondary winding 86. As soon as the bonnet temperature has risen to a predetermined value, switch 18 will be tilted to closed position completing a circuit for energizing motor 24 so as to operate it at reduced speed in the same manner as in the previous modification, the said circuit being from line conductor 85 through wire 242, switch 18, wire 243, motor 224 and wire 244 back to line conductor 84. Warm air will now be circulated to the space being heated at the first stage capacity of the system in the manner similar to that in the previous modification.

Let it be assumed now that while the system is operating at its first stage capacity, the outdoor temperature drops to a predetermined value for which the outdoor temperature controller may be set and which may be 45°, for example, causing closure of mercury switch 222. Secondary valve S' will now be again energized and opened by means of the following circuit: from secondary winding 86 through wire 226, wire 228, switch 19, wire 229, wire 233, valve S', wire 234, switch blade 206, fixed contact 209, wire 245, mercury switch 222, wire 246 and wire 225 back to secondary winding 86. Valve S' will now open, supplying additional fuel to the burner, causing increased heating at the furnace and consequently a rise in temperature therein. At a predetermined value of bonnet temperature higher than the value at which switch 18 was closed, switch 17 will close completing a circuit for increasing the speed of motor 24 to its maximum speed in the same manner as was described in connection with the previous modification, this circuit being as follows: from secondary winding 86 through wire 247, through the speed changing relay disposed within the motor casing, wire 248, switch 17, wire 249, switch blade 207, fixed contact 210, wire 250 and wire 225 back to the secondary winding 86. The fan 23 will now be operated at a relatively higher speed and the system will be supplying heat for the spaces to be heated at maximum capacity. If now the outdoor temperature should rise above 45° while the space thermostat is still calling for heat, the system will drop back to its first stage capacity in a manner similar to that described in connection with Figure 1.

In the form of my invention disclosed in Figure 2 the arrangement is such that when the space thermostat is satisfied, if the outdoor temperature is below a predetermined value, heat will nevertheless be gently supplied to the spaces being heated whereby the space thermostat remains in its satisfied position for a longer period of time and thereby greater economy of operation may be obtained. Let it be assumed now that the space thermostat is satisfied and the outdoor temperature drops below the predetemined value for which the outdoor controller is set while the space thermostat remains satisfied. Upon closure of mercury switch 222 valve P' will be energized and opened through the following circuit: from secondary winding 86 through wire 226, wire 228, switch 19, wire 229, valve P', wire 231, wire 251, switch 222, wire 246 and wire 225 back to secondary winding 86. Simultaneously, valve S' will be energized through the following circuit: from secondary winding 86 to wire 229 similarly to the above circuit, through wire 233, valve S', wire 234, wire 235, the right end of switch 15, wire 236, fixed contact 218, switch blade 216, wire 237, wire 231 and from wire 231 through wire 251 and back to secondary winding 86 similarly to the latter part of the above described circuit; hence valves P' and S' will open simultaneously for insuring proper ignition of the burner and upon a rise in stack temperature valve S' will be closed in the same manner as has already been described. Also the fan will be caused to operate at its first stage speed in response to bonnet temperature in the same manner as has already been described. If the heat which is now being supplied is not sufficient to maintain the space thermostat in its satisfied position, the said space thermostat will close and will bring about the second stage operation of the system by causing energizing of electrical circuits which have already been traced and described in detail.

Referring to the switches 17, 18 and 19, for purposes of illustration it may be suggested that switch 18 be set to close at a bonnet temperature of, for example, 110°, while switch 17 may be adjusted to close at 150°. Switch 19 forms a high limit switch and will open and discontinue heating in response to a predetermined relatively high bonnet temperature at which it is no longer desired to further supply heat.

From the foregoing it should be apparent that I have provided a novel air conditioning control sysem in which I produce an unusual and highly beneficial sequence of control operations which are brought about entirely automatically and which contribute substantially to the safety, reliability and economy of operation of the system. The system operates automatically to more nearly balance the heating capacity and fuel consumption of the system against the need for heat as determined either by the number of zones needing heat in a zone system or by outdoor tempertaures in a system not of the zone type. My control arrangement tends to reduce the frequency of operation of the control instruments, relays, valves, etc., and thereby reduces heating costs by cutting down on the amount of starting and stopping required of the apparatus and maintaining the space temperature at the required value for longer periods of time.

While I have disclosed two of the preferred forms of my invention, it is to be appreciated that many changes therein will occur to and may be made by those skilled in the art without departing from the spirit and scope of the invention. I therefore intend that I shall be limited not by my disclosure but only by the claims appended hereto.

I claim as my invention:

1. In an air conditioning system of the type having a plurality of zones, in combination, heating means and air circulating means for serving the various zones, a thermostat in each zone for controlling the supply of heated air thereto, means for varying the capacity of the heating means, and control means for operating said heating means at maximum capacity whenever any one thermostat calls for heat and for reducing the heating capacity as soon as the temperature of the heating means rises.

2. In an air conditioning system of the type having a plurality of zones, in combination, heating means and air circulating means for serving the various zones, a thermostat in each zone for controlling the supply of heated air thereto, means for varying the capacity of the heating means, and control means for operating said heating means at maximum capacity whenever any one thermostat calls for heat and for reducing the heating capacity as soon as the temperature of the heating means rises, said heating means continuing to operate at maximum capacity in the event another thermostat calls for heat.

3. In an air conditioning system of the type having a plurality of zones, in combination, heating means and air circulating means for serving the various zones, a thermostat in each zone for controlling the supply of heated air thereto, means for varying the capacity of the heating means, and control means for operating said heating means at maximum capacity whenever any one thermostat calls for heat and for reducing the heating capacity as soon as the temperature of the heating means rises, said control means causing said heating means to again operate at maximum capacity in the event a second thermostat calls for heat.

4. In an air conditioning system of the type having a plurality of zones, in combination, heating means and air circulating means for serving the various zones, a thermostat in each zone for controlling the supply of heated air thereto, means for varying the capacity of the heating means and means for varying the rate of circulation provided by said circulating means, control means for operating said heating means at maximum capacity whenever any one thermostat calls for heat and for reducing the heating capacity as soon as the temperature of the heating means rises, said circulating means providing increased circulation of air upon another thermostat calling for heated air.

5. In an air conditioning system of the type having a plurality of zones, in combination, heating means and air circulating means for serving the various zones, a thermostat in each zone for controlling the supply of heated air thereto, means for varying the capacity of the heating means and means for varying the rate of circulation provided by said circulating means, control means for operating said heating means at maximum capacity whenever any one thermostat calls for heat and for reducing the heating capacity as soon as the temperature of the heating means rises, said heating means again operating at maximum capacity upon another thermostat calling for heat and said circulating means providing increased circulation of air when the temperature of the heating means rises to a predetermined higher value.

6. In an air conditioning system in combination, heating means, and air circulating means for serving a space to be heated, means for varying the capacity of the heating means and a space thermostat for controlling the heating means, control means including an outdoor thermostat for operating the heating means at maximum capacity when the space thermostat calls for heat, and for reducing the heating capacity when the temperature of the heating means rises, said heating means continuing to operate at maximum capacity in the event the outdoor temperature is below a predetermined value.

7. In an air conditioning system in combination, heating means, an air circulating means for serving a space to be heated, means for varying the capacity of the heating means and a space thermostat for controlling the heating means, control means including an outdoor thermostat for operating the heating means at maximum capacity when the space thermostat calls for heat, and for reducing the heating capacity when the temperature of the heating means rises, said control means causing said heating means to again operate at maximum capacity in the event the outdoor temperature falls below a predetermined value.

8. In an air conditioning system, in combination, heating means, and air circulating means for serving a space to be heated, means for varying the capacity of the heating means and a space thermostat for controlling the heating means, means for varying the rate of air circulation provided by said air circulating means and control means comprising an outdoor thermostat for operating the heating means at maximum capacity when the space thermostat calls for heat and for reducing the heating capacity when the temperature of the heating means rises, said air circulating means providing increased circulation when the temperature of the heating means reaches a predetermined value and said heating means continuing to operate at maximum capacity in the event the outdoor temperature is below a predetermined value.

9. In an air conditioning system, in combination, heating means, and air circulating means for serving a space to be heated, means for varying the capacity of the heating means and a space thermostat for controlling the heating means, means for varying the rate of air circulation provided by said air circulating means and control means comprising an outdoor thermostat for operating the heating means at maximum capacity when the space thermostat calls for heat and for reducing the heating capacity when the temperature of the heating means rises, said air circulating means providing increased circulation when the temperature of the heating means reaches a predetermined value and said control means again causing said heating means to operate at maximum capacity in the event the outdoor temperature falls below a predetermined value.

10. In a heating system, in combination, heating means for heating a space, plural stage means comprising primary and secondary fuel valve means for operating said heating means at maximum or reduced capacity, control means comprising a space thermostat and a switch responsive to the heating means operable upon a rise or fall in temperature thereof irrespective of the magnitude of the temperature, said control means causing both the primary and secondary valve means to open upon the initiation of a call for heat by the thermostat, and said switch causing closure of the secondary valve means upon a rise in temperature to which the switch is responsive.

11. In a heating system, in combination, heating means for heating a space, plural stage means comprising primary and secondary fuel valve means for operating said heating means at maximum or reduced capacity, control means comprising a space thermostat and a switch responsive to the heating means operable upon a rise or fall in temperature thereof irrespective of the magnitude of the temperature, said control means causing both the primary and secondary valve means to open upon a call for heat by the thermostat, and said switch causing closure of the secondary valve means upon a rise in temperature to which the switch is responsive, said control means also including an outdoor thermostat controlling the valve means for producing operation of the heating means at maximum capacity when the outdoor temperature is below a predetermined value.

12. In a fluid distributing system, in combination, variable capacity fluid treating means, means for distributing fluid from said treating means to a plurality of regions for the purpose of modifying the condition of the air in said regions, control apparatus comprising individual means responsive to the temperature in each of said regions for controlling the supply of fluid thereto, said control apparatus embodying means for increasing the capacity of the fluid treating means in response to the number of regions demanding fluid and means for similarly increasing the rate of circulation of fluid by the distributing means.

13. In a fluid distributing system, in combination, variable capacity fluid treating means, means for distributing fluid from said treating means to a plurality of regions for the purpose of modifying the condition of the air in said regions, control apparatus comprising individual means responsive to the temperature in each of said regions for controlling the supply of fluid thereto, said control apparatus embodying means for operating the fluid treating apparatus at relatively high capacity upon starting and at reduced capacity thereafter, said fluid treating apparatus normally operating at a capacity depending upon the number of regions demanding fluid, and means for causing said fluid distributing means to circulate fluid in response to the number of regions demanding fluid.

14. In a fluid circulating system, in combination, variable capacity fluid treating means, means for circulating fluid from said treating means to a region wherein the condition of the air is to be controlled, control means comprising a space thermostat in said region controlling said fluid treating means, and an outdoor thermostat for varying the capacity of said means, said control means being effective to cause continuous operation of said fluid treating means in response to said outdoor thermostat.

15. In a fluid circulating system, in combination, variable capacity fluid treating means, means for circulating fluid from said treating means to a region wherein the condition of the air is to be controlled, control means comprising a space thermostat in said region controlling said fluid treating means, and an outdoor thermostat for varying the capacity of said means, and means for varying the rate at which fluid is circulated by said circulating means, said control means being effective to cause continuous operation of said fluid treating means in response to said outdoor thermostat.

16. In a heating system, in combination, heating means for heating a building, plural stage means comprising primary and secondary fuel valve means for operating said heating means at increased or reduced capacity, control apparatus comprising temperature responsive means for measuring generally the heating load requirements of the building as a whole at any given time, said temperature responsive means including at least one space thermostat, said control apparatus including a switch responsive to heating means operable upon a rise or fall in temperature thereof irrespective of the magnitude of the temperature, said control apparatus causing both the primary and secondary valve means to open upon a call for heat by the thermostat, said switch causing closure of the secondary valve means upon a rise in temperature to which the switch is responsive, and said temperature responsive means being operatively associated with said secondary valve so as to be operable to open said secondary valve in response to an indication of increased heating load requirements.

17. In a heating system, in combination, heating means for heating a space, said heating means being of a type employing a fluid heat transporting medium, plural stage means comprising primary and secondary fuel valve means for operating said heating means at increased or reduced capacity, variable speed means for circulating said fluid medium to spaces being heated, control means comprising a space thermostat and a switch responsive to the heating means operable upon a rise or fall in temperature thereof irrespective of the magnitude of the temperature, said control means causing both the primary and secondary valve means to open upon a call for heat by the thermostat and bringing about operation of said circulating means, said switch causing closure of the secondary valve means upon a rise in temperature to which the switch is responsive, and means responsive to the temperature of the heating means for increasing the speed of said circulating means upon an increase in temperature at the heating means.

18. In a heating system, in combination, heating means for heating a building, plural stage means comprising primary and secondary fuel valve means for operating said heating means at increased or reduced capacity, said heating means being of a type employing a fluid circulating medium, variable speed means for circulating said medium to spaces being heated, control apparatus comprising temperature responsive means for measuring generally the heating load requirements of the building as a whole at any given time, said temperature responsive means including at least one space thermostat, said control apparatus including a switch responsive to the heating means operable upon a rise or fall in temperature thereof irrespective of the magnitude of the temperature, said control apparatus causing both the primary and secondary valve means to open upon a call for heat by the thermostat, said switch causing closure of the secondary valve means upon a rise in temperature to which the switch is responsive, said temperature responsive means being operatively associated with said secondary valve so as to be operable to open said secondary valve in response to an indication of increased heating load requirements whereby the temperature at said heating means is increased, and means responsive to said increased temperature for increasing the speed of said circulating means.

19. In a system for conditioning the air in a space, in combination, means for heating air, means for circulating the heated air between said heating means and said space, means for varying the capacity of the heating means, means indicative of the need for operation of said heating means comprising at least two thermostats, control means responsive to the initiation of a call for heat by one of said thermostats for operating said heating means at maximum capacity, means normally responsive to a rise in temperature of said heating means for operating said heating means at reduced capacity, and further control means responsive to a call for heat by more than one of said thermostats for overcoming said temperature-responsive means and continuing the operation of said heating means at maximum capacity.

CLARENCE W. NESSELL